Patented Jan. 8, 1935

1,987,228

UNITED STATES PATENT OFFICE 1,987,228

OCTYLPHENOLS AND ETHERS THEREOF

Herman A. Bruson, Philadelphia, Pa., assignor to The Resinous Products & Chemical Company, Inc., Philadelphia, Pa.

No Drawing. Application November 14, 1933, Serial No. 697,928

8 Claims. (Cl. 260—154)

This invention relates to condensation products of phenols or phenyl ethers with mixed dipolymers of the three isomeric butylenes, boiling within a range of 106–123° C. at 760 m m.

In the vapor phase cracking of petroleum to form gasoline, considerable quantities of the three isomeric butylenes mixed with butane are obtained. This gaseous mixture has very little commercial value at the present time except as a substitute for illuminating gas. It contains about 45% by weight of butenes and 55% of butane. Approximately 15% is isobutylene and 30% is a mixture of butene-1 and butene-2. Upon treatment with concentrated sulfuric acid, the three isomeric butylenes polymerize and condense with each other to form a complex mixture of higher molecular olefines boiling from about 100° C. to 200° C. at 760 m. m.

Upon carefully fractionating such a mixture of polymers and condensation products of the three isomeric butylenes, an olefine (octene) fraction is obtained which boils at 106–123° C. (760 m. m.). This fraction is substantially free from diisobutylene and tri-isobutylene. Most of it boils at 106–116° C. (760 m. m.) It is also free from straight-chained olefines.

The above octene fraction of boiling range 106–123° C. or 106–116° C. is very reactive and according to the present invention combines readily with phenols having free ortho or para positions to the hydroxyl group, in the presence of a small quantity of concentrated sulfuric acid as a catalyst, so as to alkylate such free nuclear positions. The products form a mixture the individual components of which possess the general formula $C_8H_{17}$—R—OH where $C_8H_{17}$ represents a branched-chain octyl group other than the alpha, alpha, gamma, gamma-tetramethyl-butyl group, and R represents an aromatic hydrocarbon ring which can be either monocyclic or polycyclic, and which can contain nuclear halogen, hydroxyl, alkoxy-, alkyl-, aryl-, aryloxy-, carboxyl, or nitro groups. By condensing phenyl ethers such as anisol, phenetol, diphenyloxide, or guaicol with the dibutene fraction of boiling range 106–116° C. or 106–123° C., the nuclear octyl substituted ethers can be obtained of the formula $C_8H_{17}$—R—O—X where X is a hydrocarbon radical of the original ether.

It is already known in the prior art that olefines will condense with phenols to form nuclear alkylated phenols. Propylene, butylenes, amylene cyclohexene, diamylene, diisobutylene, styrene, and indene have thus been condensed with phenols to form nuclear substituted phenols. In most of these cases undesirable ethers are formed which must be separated from the phenols. If octene-1 or octene-2 (or a mixture of the two) is used in place of the olefines heretofore employed in condensations with phenol, only traces of octylphenol are obtained regardless of the methods used. The only octylphenol which it has heretofore been possible to prepare in good yield by direct condensation of an olefine with phenol is the alpha, alpha, gamma, gamma-tetramethyl-butyl-phenol from diisobutylene and phenol. (Niederl, J. Am. Chem. Soc. 55, 2571 (1933)).

One of the objects of the present invention is to prepare an isomeric mixture of new octylphenols and ethers of octylphenols by polymerizing the mixture of the three butylene isomers from petroleum cracking operations, by means of sulfuric acid, fractionating therefrom a specific dibutene mixture boiling within the range of 106–123° C. which is substantially free from the well-known diisobutylene, and condensing said dibutene of boiling range 106–123° C. or 106–116° C. with phenols or phenol ethers through the agency of a small quantity of concentrated sulfuric acid as a catalyst. By this method new octylphenols can be prepared in high yield and purity at a very low cost. Such new octylphenols can be used as germicides and antiseptics in soaps and in oils; as antioxidants in rubber, gasoline, soaps and vegetable oils; as raw materials for making resins by condensation with formaldehyde, furfural, and other aldehydes, and as plasticizers for resinous compositions. They have the advantage over the octylphenols made from diisobutylene of a lower cost of production, because of the greater availability of the olefine, since the quantity of diisobutylene obtained by co-polymerizing a mixture of the three isomeric butylenes as they occur in the cracked distillate is only about 1% of the total butylene polymers whereas the quantity of the dibutene fraction of boiling range 106–123° C. is 20–35% of the total polymeric mixture. These new octylphenols are isomeric, but not identical with the known octylphenols prepared from diisobutylene.

The condensation between phenols and the dibutenes of boiling range 106–123° C. or 106–116° C. is preferably carried out by adding concentrated sulfuric acid slowly, and with stirring, to the mixture at a temperature below 50° C.; advantageously at 28–35° C. Alternatively the sulfuric acid can be mixed with the olefine, and the phenol added thereto, or vice versa, but this procedure requires a very much lower temperature to prevent resinification and leads to considerable ether formation. For best results the phenol and the dibutene should be used in equimolar proportions unless a di-substituted phenol is desired, in which case two mols of dibutene should be used per mol of the phenol. The sulfuric acid used should be of a strength greater than 90% $H_2SO_4$ and less than 100% $H_2SO_4$ and for best results should be 93–96% $H_2SO_4$. A very important factor is the quantity of 96% $H_2SO_4$ used. This should be preferably, though not necessarily, an amount corresponding to 0.13–0.30 mol $H_2SO_4$ per mol of dibutene, and is most advantageously 0.18 mol $H_2SO_4$ per mol of dibutene. Suitable phenols for the herein described condensation with dibutenes are phenol itself, beta-naphthol, resorcinol, pyrocatechol, hydroquinone, alkylated phenols, such as o-, m-, or p-cresol, xylenols, isopropylphenols, halogenated phenols such as m-chlorphenol, nitrophenols, salicylic acid, p-hydroxybenzoic acid; also phenol ethers such as anisole, phenetol, guaicol, diphenyl ether and their obvious equivalents.

The products obtained by condensing any of the above phenols or phenyl ethers with dibutene as herein specified are probably mixtures of several isomeric nuclear octyl derivatives of the phenols or phenyl ethers employed since the dibutenes used are a mixture of several branched chain octenes. The products, however, boil within a very narrow range.

The following examples are given by way of illustration and not limitation.

Example 1

(a) 94 grams of phenol are mixed with 112 grams of a dibutene fraction B. P. 106–116° C. (760 m. m.) prepared as described above. The mixture is cooled to 25° C. and with rapid stirring a few drops of 96% sulfuric acid are added. The temperature tends to rise but is controlled by surrounding the vessel with cold water, so that the temperature during the addition of the sulfuric acid remains at about 28–32° C. A total of 18 grams of 96% $H_2SO_4$ is run in during the course of 1 hour. The mixture is then allowed to stand at ordinary room temperature (25° C.) for 6–24 hours to complete the reaction. The brown oil obtained is mixed with 3 liters of water containing slightly more than the theoretical quantity of sodium hydroxide required to neutralize the acid and the mixture heated to 90° C. with stirring for a short time so as to completely neutralize all of the free acidity. The oil layer is separated, washed with water, and distilled under reduced pressure. The octylphenol came over as a colorless oil at 137–142° C. under 2 m. m. pressure of mercury. Upon cooling it solidified to a waxy crystalline mass. The yield was about 65% of theory.

(b) Similarly 94 grams of phenol were condensed with 112 grams of a dibutene fraction of boiling range 116–123° C. as prepared by polymerizing a mixture of the three isomeric butylenes and fractionating out any diisobutylene. Upon working up the condensate as in (a) there was obtained 122 grams of colorless crystalline product boiling at 139–143° C. under 3 m. m.

Example 2

(a) 162 grams ortho-cresol and 168 grams of the 106–116° C. boiling fraction of dibutene were mixed and treated with 27 grams of 96% $H_2SO_4$ during one hour as described in Example 1. The mixture was allowed to stand 8 hours at 20–25° C. and then washed with water and sodium carbonate solution sufficient to neutralize any free acidity. The washed, neutral oil was then purified by distillation in vacuo. It formed a colorless somewhat viscous oil which upon redistillation boiled at 127–131° C. under 2 m. m. pressure. In a similar manner m- or p-cresol can be condensed with dibutene.

(b) The condensation product of resorcinol and the dibutene formed a viscous yellow oil boiling at 155–175° C. under 3 m. m.

Example 3

108 grams anisol (methylphenyl ether) was mixed with 112 grams of dibutene of boiling range 106–116° C. and 18 grams of 96% $H_2SO_4$ added dropwise during 1 hour with constant stirring. The temperature was kept at 28–32° C. during the addition of the acid. The mixture was then allowed to stand 24 hours at room temperature and worked up by washing and distillation in vacuo as described in Example 1. Octylanisol came over as a thin oil boiling at 115–120° C. under 2 m. m. mercury pressure.

The above examples are typical of the method for preparing octylphenols and octylaryl ethers by condensing, respectively, a member of group consisting of phenols and aryl ethers with dipolymers of the mixed butylenes other than diisobutylene in the presence of concentrated sulfuric acid as a catalyst.

Any of the other phenols enumerated herein can be used mole for mole in place of those specified in the examples.

Although in the above examples it is preferable to employ sulfuric acid in amounts substantially less than a molecular equivalent amount, greater amounts can be used if desired. Likewise the other ingredients can be varied as well as the condition of operation, temperatures, etc., all within the spirit of the invention the scope of which is limited only by claims, it being understood that no modification of the invention is claimed to the exclusion of any other modification.

What I claim is:

1. In the process for making mixed isomeric octylphenols and ethers thereof, the step which consists in reacting respectively a member of the group consisting of phenols having a free ortho or para position to the hydroxyl group and ethers thereof, in the presence of concentrated sulfuric acid as a catalyst, with mixed octenes boiling within the range of 106–123° C., said octenes being derived by polymerization of a mixture of the three isomeric butenes from cracked petroleum distillates.

2. A condensation product of a phenol and mixed octenes which boil within the range of 106–123° C. and which are derived by polymerization of the mixed butenes from cracked petroleum distillates, said condensation product being a mixture of isomeric octylphenols.

3. A condensation product of phenol and mixed octenes boiling at 106–116° C. which are derived by polymerization of the mixed butenes from cracked petroleum distillates, said condensation product being a colorless, crystalline mass boiling at 137–142° C. at 2 m. m.

4. A condensation product of phenol and mixed octenes boiling at 116–123° C. which are derived by polymerization of the mixed butenes from cracked petroleum distillates, said condensation product being a colorless, crystalline mass boiling at 139–143° C. at 3 m. m.

5. A condensation product of ortho-cresol and mixed octenes boiling at 106–116° C. which are derived by polymerization of the mixed butenes from cracked petroleum distillates, said condensation product being a colorless oil boiling at 127–131° C. at 1 to 2 m. m.

6. In the process for making mixed isomeric octylphenois, the step which consists in reacting 1 mol. equivalent of a phenol having a free ortho or para position to the hydroxyl group with at least 1 mol. equivalent of mixed octenes boiling within the range of 106–123° C. which are derived by polymerization of the mixed butenes from cracked petroleum distillates, in the presence of concentrated sulfuric acid as a catalyst at a temperature below 50° C.

7. A process as set forth in claim 6, in which the sulfuric acid used is of 93–96% $H_2SO_4$ content, in an amount equal to about 0.13–0.30 mol. $H_2SO_4$ per mol. of the octenes employed.

8. The process which consists in reacting 1 mol. equivalent of phenol with 1 mol. equivalent of mixed octenes boiling at 106–116° C. which are derived by polymerization of the mixed butenes from cracked petroleum distillates, in the presence of about 0.18 mol. 95–96% sulfuric acid at a temperature of 28–32° C.

HERMAN A. BRUSON.